United States Patent [19]

Komatu

[11] 4,045,375
[45] Aug. 30, 1977

[54] HIGHLY ELECTRON-CONDUCTIVE COMPOSITION

[75] Inventor: Masao Komatu, Tokyo, Japan

[73] Assignee: Koshi Arita, Tokyo, Japan

[21] Appl. No.: 634,632

[22] Filed: Nov. 24, 1975

[30] Foreign Application Priority Data

June 20, 1975 Japan ................... 50-75855

[51] Int. Cl.$^2$ ............................................. H01B 1/08
[52] U.S. Cl. ................................. 252/519; 252/520; 252/521; 106/73.2; 310/10; 310/11
[58] Field of Search .................. 252/519, 520, 521; 106/73.2; 310/10, 11

[56] References Cited

U.S. PATENT DOCUMENTS

| | | |
|---|---|---|
| 3,441,517 | 4/1969 | Brauer et al. ............. 252/519 X |
| 3,475,352 | 10/1969 | Barbier et al. ............ 252/521 X |
| 3,531,421 | 9/1970 | Foex et al. ................. 252/521 |
| 3,630,968 | 12/1971 | Hamano et al. ............ 252/521 |

Primary Examiner—Benjamin R. Padgett
Assistant Examiner—E. Suzanne Parr
Attorney, Agent, or Firm—Armstrong, Nikaido & Marmelstein

[57] ABSTRACT

Multiple oxides of the general formula $(L_{1-x} M_x)(Q_{1-y} R_y)O_3$, in which L is an element of atomic number 57 – 71, M is an element of Ca, Sr or Ba, Q and R are mutually different elements of atomic number 21 – 30 or Zr, $0 \leq x < 1$ and $0 < y < 1$, have excellent electron-conductivity and thermal stability.

6 Claims, 6 Drawing Figures

HIGHLY ELECTRON-CONDUCTIVE COMPOSITION

BACKGROUND OF THE INVENTION

This invention relates to highly electron-conductive composition showing excellent thermal stability or quite small evaporation loss even at a high temperature near melting point. Hereinbefore, it has been known that multiple oxides of the general formula $(L_{1-x}M_x)QO_3$, such as La 0.9 Ca 0.1 $CrO_3$, Nd 0.77 Sr 0.23 $CoO_3$ and $PrCoO_3$, show electron-conductivity at from ordinary temperatures to high temperatures. These muliple oxides have high melting points of at least 1500° C. Recently, they have been gradually utilized as electrode materials for fuel cells and MHD transformers. However, the electrical and physical properties of these known multiple oxides are deteriorated at high temperature near their melting points, therefore, it is a serious problem that their life is short. Such a disadvantage is caused by evaporation of components composing the multiple oxides, and one of the main evaporating components is oxide of Q in the general formula $(L_{1-x}M_x)QO_3$. When a part of the components of multiple oxide is evaporated in such a manner, the crystal structures of the multiple oxides themselves are changed to cause shortening of their life. When the above Q is evaporated almost 1% by weight of $(L_{1-x}M_x)QO_3$, excess oxides of $(L_{1-x}M_x)$ are swelled in accordance with their hydration under leaving them alone at ordinary temperature, and, finally, decomposed spontaneously. An object of this invention is to overcome the problems and disadvantages of the known multiple oxides. A further object of this invention is to provide novel highly electron-conductive composition which is scarcely evaporated even at high temperature near the melting point.

Other objects and advantages of this invention will become apparent hereinafter.

SUMMARY OF THE INVENTION

The objects of this invention may be achieved by providing highly electron-conductive composition containing multiple oxide of the general formula $(L_{1-x}M_x)(Q_{1-y}R_y)O_3$, in which L is an element of atomic number 57 ~ 71. M is an element of Ca, Sr or Ba, Q and R are mutually different elements of atomic number 21 ~ 30 or Zr, $0 > x < 1$ and $0 < y < 1$.

DRAWINGS

DESCRIPTION OF THE PREFERRED EMBODIMENT

The inventors of this invention have investigated the above mentioned problems of the convenient multiple oxides in view of crystal study and found that when strain is artificially formed in crystal structure of the multiple oxide, lattice energy at weak bond is enlarged to prevent evaporation.

Accordingly, this invention is characterized that a part of Q in $(L_1-xM_x)(Q_1-yR_y)O_3$ is substituted by another element R to give strain in the crystal structure. L, M, Q and R are selected from the following elements, respectively. L : elements of atomic number 57 ~ 71, namely, La, Ce, Pr, Nd, Pm, Sm, Eu, Gd, Tb, Dy, Ho, Er, Tm, Yb and Lu. M :Ca, Sr and Ba. Q and R : Zr, Sc, Ti, V, Cr, Mn, Fe, Co, Ni, Cu and Zn. The highly electron-conductive compositions of this invention are those given strain to "Perovskite" type crystal structure, and accordingly, the general formula should be $(L_1-xM_x)$ $(Q_1-yR_y)O_3$ exactly shown as $(L_1-xM_x)(Q_1-yR_y)O_3-\delta$ (in which $\delta$ is a factor showing degree of defect of "Perovskite" structure and nearly O). Strength of strain or lattice bonding strength may depend on difference in ionic radius of Q and R or difference in their valency. The highly electron-conductive compositions of this invention are preferably produced by mixing specific components of L,M,Q and R in the form of their oxides or salts such as carbonate, oxalate or acetate in the prescribed weights, burning at 1400 ~ 1900° C for 1 ~ 10 hours, preferably under pressing. Of course, in order to use them as an electrode, the burned products are preferably grinded into fine particles having particle size of less than 100 $\mu m$ molded into the desired form and then sintered. The highly electron-conductive compositions of the general formula $(L_1-xM_x)(Q_1-yR_y)O_3-\delta$ shown quite small evaporation loss in comparison with the known compositions. Such an advantage may depend on not only strain formed artificially in the crystal structure but also stabilization based on bonding oxide of Q, which may be evaporating, with oxide of R. Specific resistance and weight loss at high temperature of the composition of the general formula $(L_1-xM_x)(Q_1-yR_y)O_3-\delta$ are also changed on the composition ratio. Therefore, the optimum composition ratio should be determined by checking up change in specific resistance and weight loss to substitution ratio x and y for each composition. Usually, x in the general formula is preferably O (including) to 0.5 and y is preferably 0.2 to 0.8.

Hereinafter, examples of this invention are explained.

EXAMPLE 1.

Figure 1:
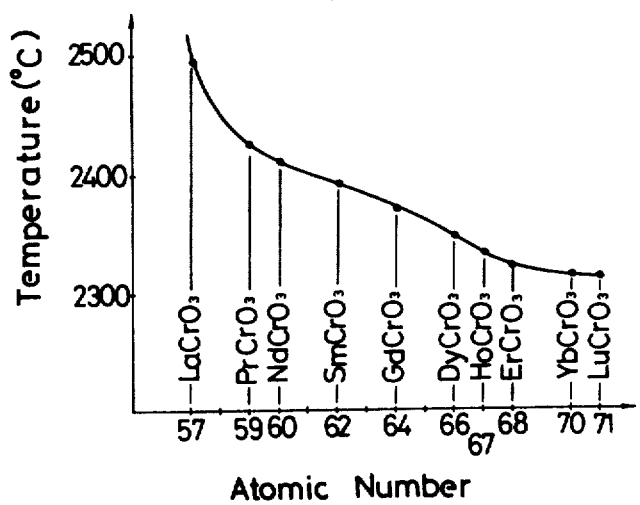
FIGS. 1 is a graph showing melting points of the known multiple oxides.
Figure 2:
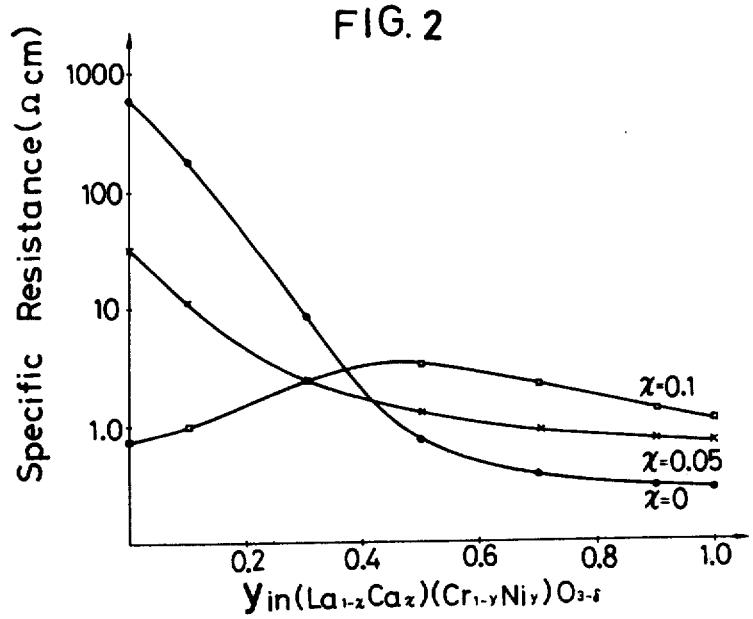
FIG. 2 and FIG. 3 are graphs showing change in specific resistance and weight loss of $(La_{1-x}Ca_x)(Cr_{1-y}Ni_y)O_{3-\delta}$.

FIG. 2 shows change in specific resistance of the compositions at ordinary temperature (25° C) to Ni-substitution ratio y, in which parameter is Ca-solid solution ratio x.

Figure 3:
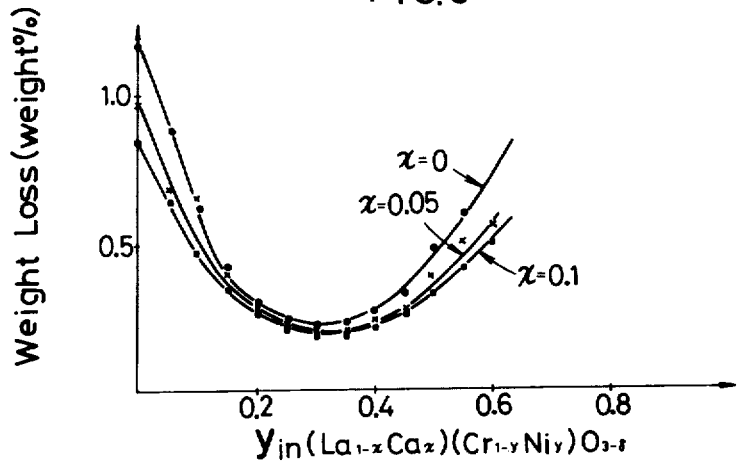

FIG. 3 shows change in weight after heat-treatment of the compositions at 1800° C for 200 hours. It is clear from FIG. 2 and FIG. 3 that evaporation loss of $(La_1-xCa_x)(Cr_1-yNi_y)O_3-$ is reduced by changing Ni-substitution ratio y and the evaporation loss in minimum at $y = (1/3)$ and at the time the specific resistance is also below 10$\Omega$cm. Also, it is clear that Ca-solid solution ratio x has little influence on the evaporation loss but has great influence on the specific resistance and the influence is reversed at $y = 0.3 \sim 0.4$. The reason why the evaporation loss is minimum at $y = (1/3)$ may be explained the following equations.

$$2 (La_1 - xCa_x) (Cr \tfrac{2}{3} Ni \tfrac{1}{3}) O_3 - \delta$$

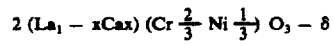

→ decomposition at high temperature →

-continued

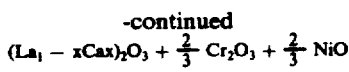

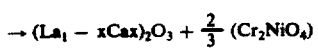

$Cr_2O_3$ and NiO, which are just evaporating may be make stable spinel structure of $Cr_2NiO_4$ to prevent evaporation. Although in burning reaction of the known $(La_1-xCa_x)CrO_3$, it is necessary to use 2 ~ 5% excess of the stoichiometrical amount of $Cr_2O_3$ in considering evaporation of $Cr_2O_3$, in case of

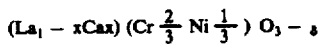

of this invention, it is possible to burn all of the components in the exactly stoichiometrical amounts. In other words, in case of

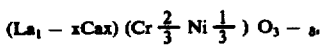

the burned product is not swelled and, accordingly, not decomposed, and evaporation of $Cr_2O_3$ and Ni during burning reaction is quite little. It may depend on that $Cr_2O_3$ and NiO, which have vapor pressures, react to produce stable $Cr_2NiO_4$ in the intermediate reaction as the following equations.

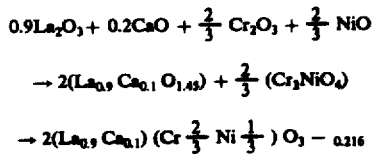

Theoretical oxygen content of the above composition is $O_{2.783}$, that is, $\delta = 0.216$, but the measured oxygen content was $\delta < 0.2$, which may depend on oxygen adsorption.

EXAMPLE 2

Figure 4:
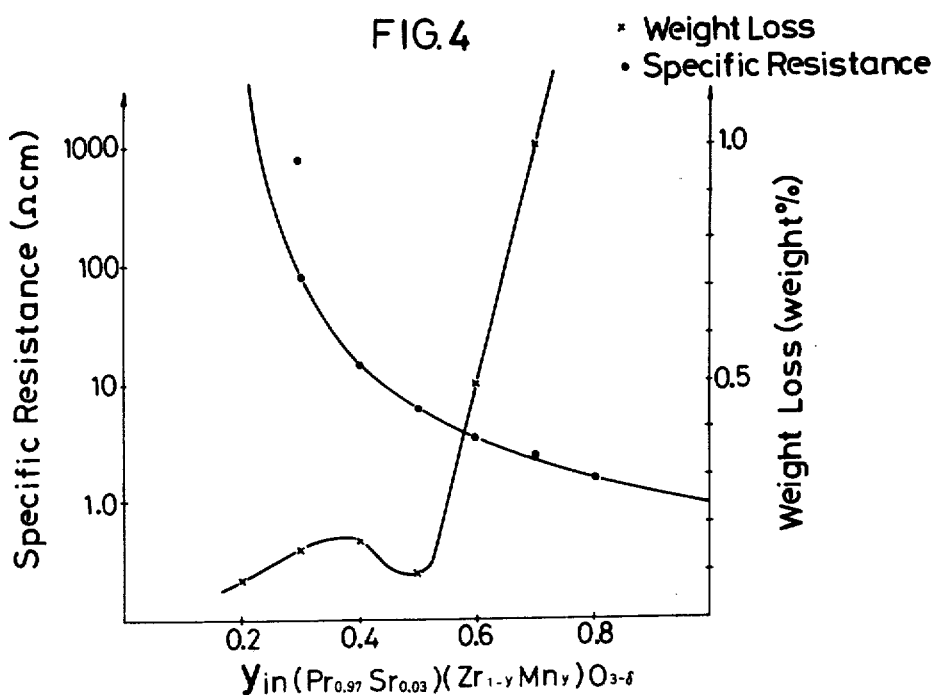
FIG. 4 is a graph showing change in specific resistance and weight loss of $(Pr_{0.97}Sr_{0.03})(Zr_{1-y}Mn_y)O_3-\delta$.

FIG. 4 shows change in specific resistance of $(Pr_1-xSr_x)(Zr_1-yMn_y)O_{3-\delta}$ at ordinary temperature (25° C) when $x = 0.03$ and $y$ was variously changed, and shows change in weight when heat-treated at 1,800° C for 200 hours. As is clear from the figure, specific resistance at $y = 0.4 \sim 1$ was $10 \sim 1$ μ cm, and weight loss at $y = 0.55$ was less than 1% by weight. Electrode material needs preferably specific resistance of less than 100 μ cm and weight loss of less than 1% by weight, and, accordingly, the composition of $y = 0.5$ is most preferable as electrode material.

EXAMPLE 3

Figure 5:
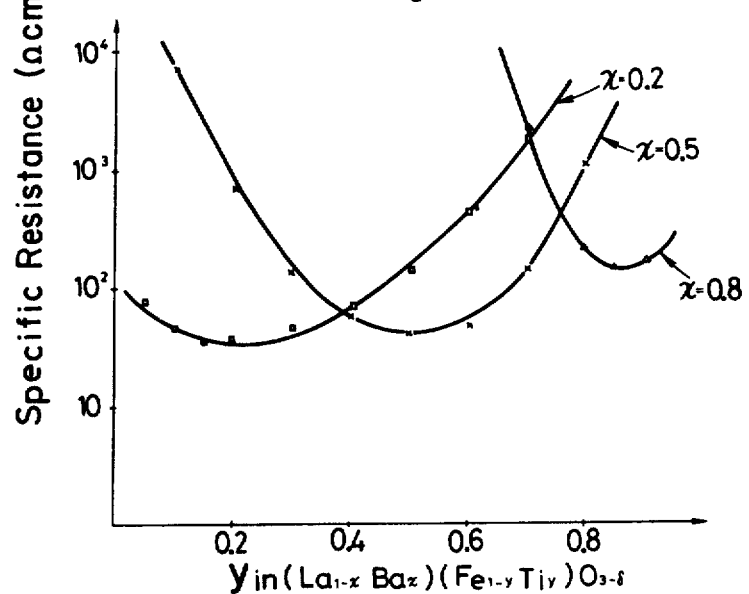
FIG. 5 and FIG. 6 are graphs showing change in specific resistance and weight loss of $(La_1-xBa_x)(Fe_1-yTi_y)O_3-\delta$.
Figure 6:
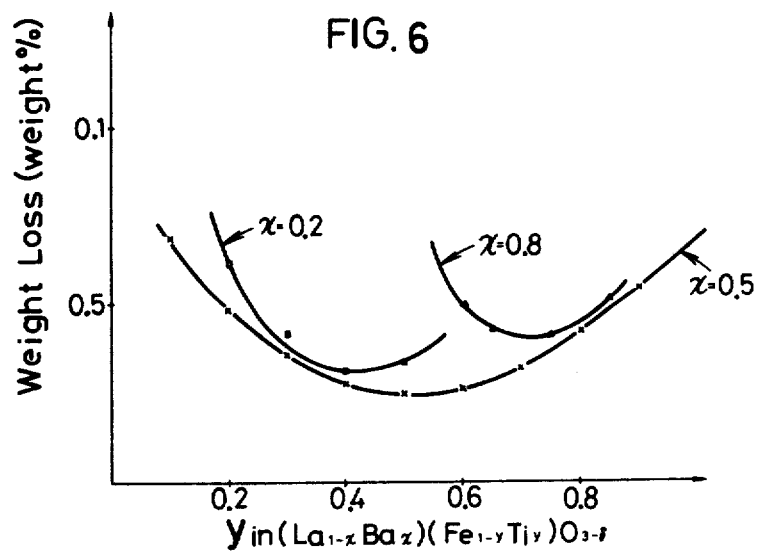

FIG. 5 shows change in specific resistance of the compositions at ordinary temperature (25° C) to Ti-substitution ratio $y$, in which parameter is Ba-solid solution ratio $x$. FIG. 6 shows change in weight after heat-treatment of the compositions at 1800° C for 200 hours. It is clear from the figures that $(La_1-xBa_x)(Fe_1-yTi_y)O_{3-\delta}$ shows highly electron-conductivity and low vapor pressure, and the composition of $x = 0.5$, $y = 0.5$ is most suitable for electrode material.

EXAMPLE 4

Lowest specific resistance of $(Yb_1-xCa_x)(Fe_1-yCo_y)O_{3-\delta}$ was 0.05 Ω cm (25° C) at $x = 0.15$, $y = 0.9 \sim 1.0$, but weight loss after 200 hours at 1500° C was below 0.3% by weight at $y = (1/3)$.

Melting point of

was 1700° ~ 1750° C and the specific resistance at 25° C was 0.25 Ω cm.

EXAMPLE 5

$(Nb_1-xSr_x)(Ni_1-yCu_y)O_{3-.67}$ had the lowest vapor pressure at $y = 0.5$ (accordingly, the least weight loss), the specific resistance in this case was the lowest, 0.2 Ω cm (25° C), at $x = 0.1$.

In the above Examples, the advantages of this invention are explained in the cases that L of $(L_1-xM_x)(Q_1-yR_y)O_{3-\delta}$ is La, Pr, Nd, Yd and Q and R are Ti, Cr, Mn, Fe, Co, Ni, Cu, respectively. The inventors of this invention have confirmed that highly electron-conductivity of $(L_1-xM_x)(Q_1-yR_y)O_{3-\delta}$ is given by ultra-exchange mutual action similary to the case of known Perovskite type composition of $(L_1-xM_x)QO_3$ in which the electron-conductivity depend on ultra-exchange mutual action concerning Q and oxygen. This mechanism of showing highly electron-conductivity is comman to the compositions of this invention as well as those shown in the above Examples. In the case of $(Q_1-yR_y) = (Sc_1-yZn_y)$, $L =$ La, Gd, Lu and M is Ca, Sr, Ba, it has been confirmed that the compositions of nearly $y = (1/3)$ and $x = 0.15$ show the best results. As is clear from the above descriptions, the multiple oxides of this invention are hard to evaporate even using at high temperature near melting point, and, accordingly, are preferably used as electrode materials for fuel cells and MHD transformers.

What is claimed is:

1. A highly electron-conductive composition comprising a multiple oxide having the general formula:

in which L is an element selected from the group consisting of La, Pr, Nd, Yb, Gd and Lu; M is an element selected from the group consisting of Ca, Sr and Ba; QR is a pair of elements selected from the group consisting of CrNi, ZrMn, FeTi, FeCo, and NiCu; and $0 \leq x < 0.5$ and $0.2 < y < 0.8$.

2. A highly electron-conductive composition comprising multiple oxide having the formual $(Pr_1-xSr_x)(Zr_1-yMn_y)O_3$ in which $x$ and $y$ are the same as defined in claim 1.

3. A highly electron-coductive composition comprising multiple oxide having the formula $(La_1-xCa_x)(Cr_1-yNi_y)O_3$ in which $x$ and $y$ are the same as defined in claim 1.

4. A highly electron-conductive composition comprising multiple oxide having the formula $(La_1-xBa_x)(Fe_1-yTi_y)O_3$ which $x$ and $y$ are the same as defined in claim 1.

5. A highly electfon-conductive composition comprising multiple oxide having the formula $(Yb_1-xCa_x)(Fe_1-yCo_y)O_3$ in which $x$ and $y$ are the same as defined in claim 1.

6. A highly electron-conductive composition comprising multiple oxide having the formula $(Nd_1-xSr_x)(Ni_1-yCu_y)O_3$ in which $x$ and $y$ are the same as defined in claim 1.

* * * * *